Feb. 3, 1970  A. KINKEAD  3,493,176
IRRIGATION METHOD AND APPARATUS
Filed March 7, 1968  3 Sheets-Sheet 2
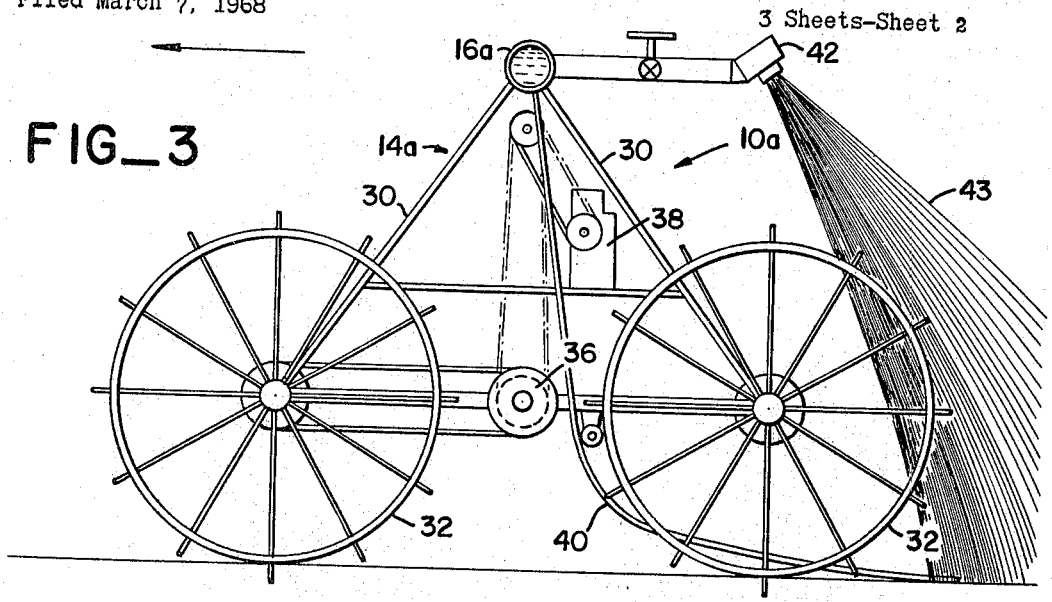
FIG_3
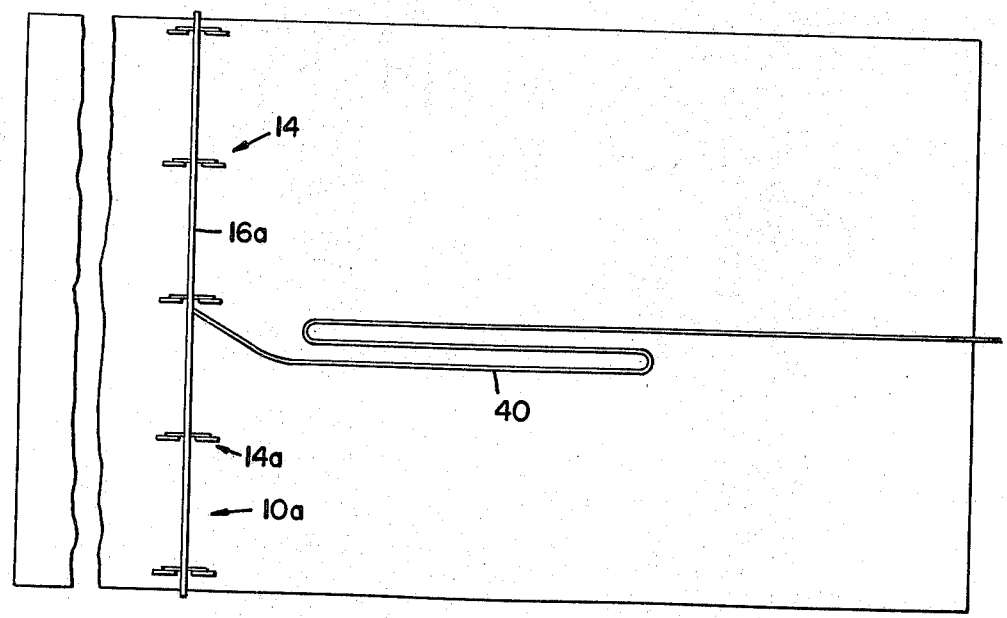
FIG_4
INVENTOR.
ALAN KINKEAD
BY
ATTORNEYS Feb. 3, 1970  A. KINKEAD  3,493,176
IRRIGATION METHOD AND APPARATUS
Filed March 7, 1968  3 Sheets-Sheet 3
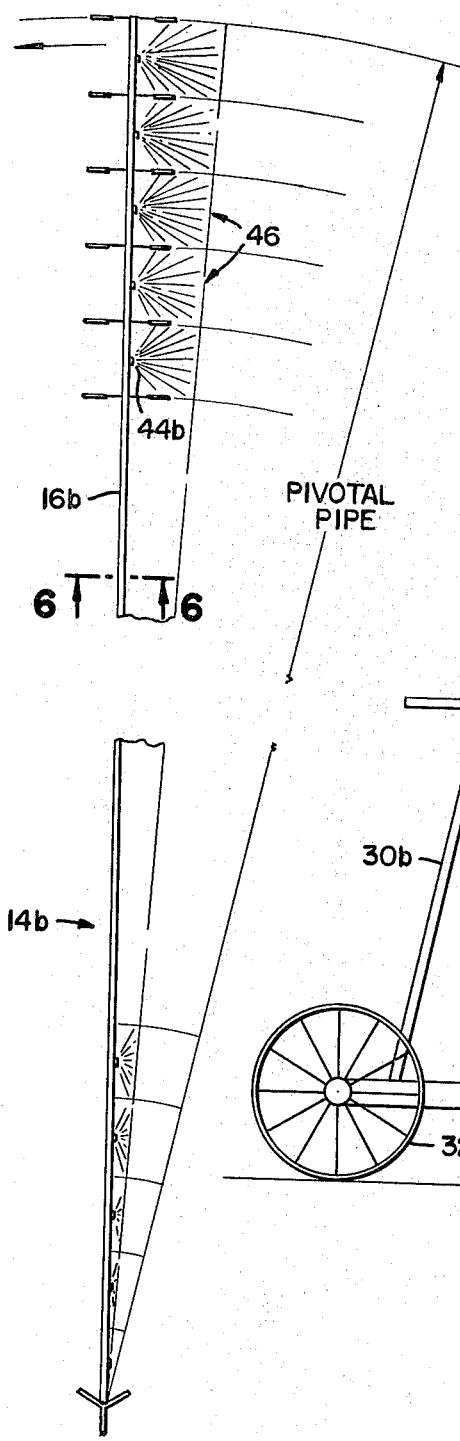
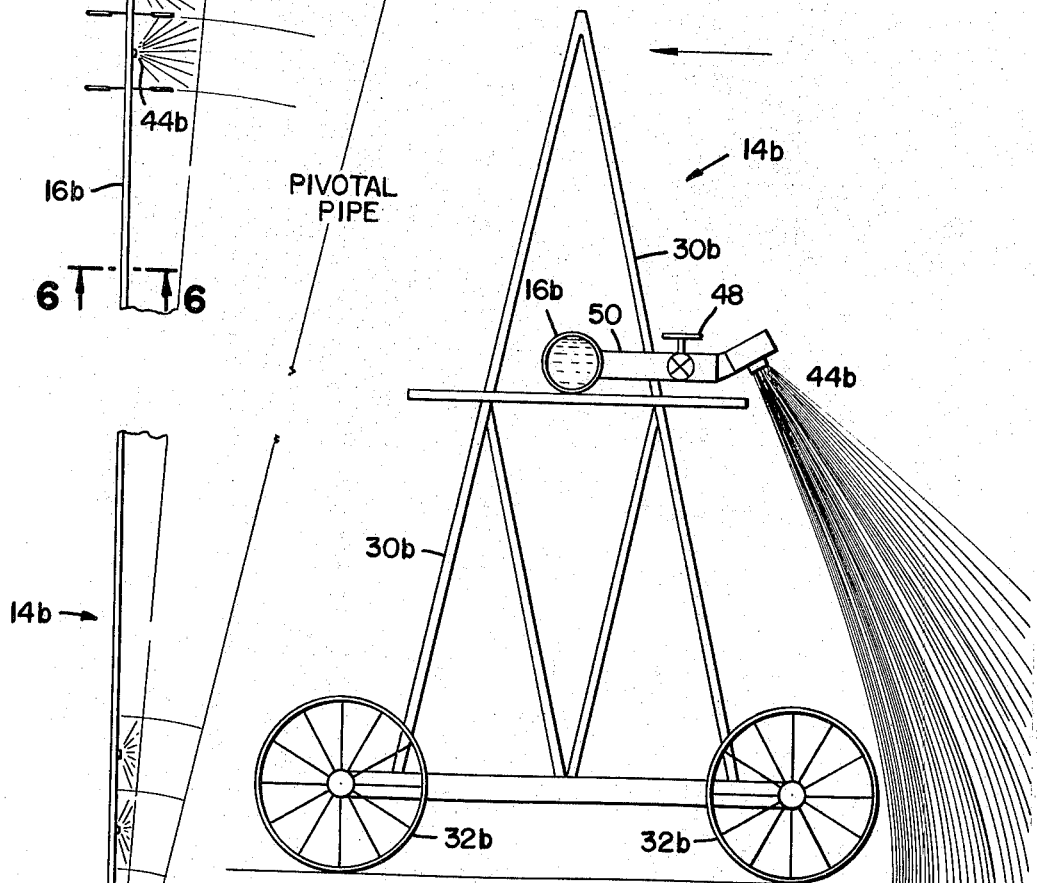
INVENTOR.
ALAN KINKEAD
BY
ATTORNEYS

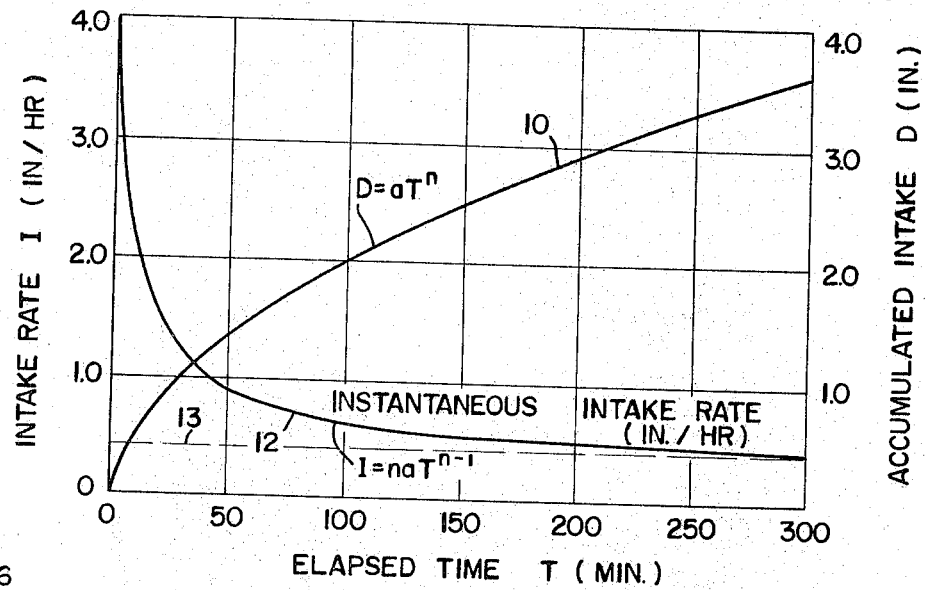
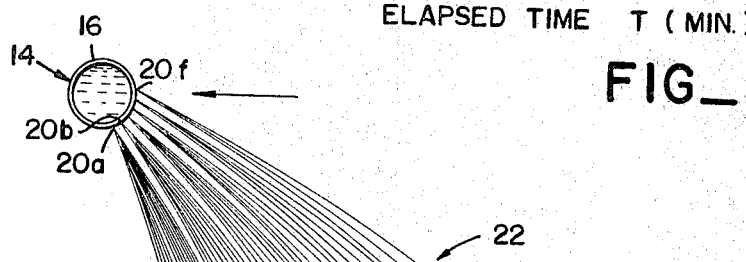
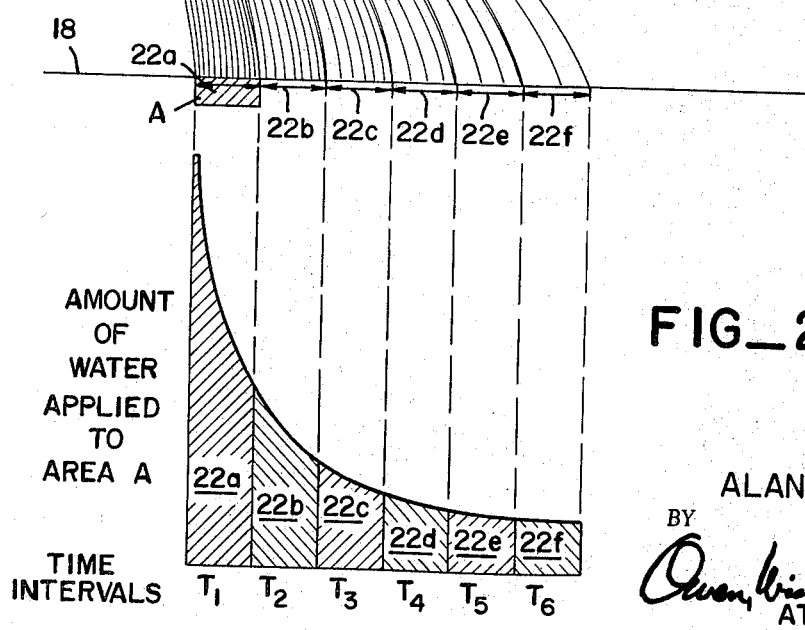

United States Patent Office 3,493,176
Patented Feb. 3, 1970

3,493,176
IRRIGATION METHOD AND APPARATUS
Alan Kinkead, Los Altos Hills, Calif., assignor to W. R. Ames Company, Milpitas, Calif., a corporation of California
Filed Mar. 7, 1968, Ser. No. 711,337
Int. Cl. A01g 25/00; B05b 1/20, 17/04
U.S. Cl. 239—11    15 Claims

ABSTRACT OF THE DISCLOSURE

A method for irrigating land by sprinkling is disclosed wherein water is discharged from a dispensing apparatus moving over the ground so that every increment of ground area initially receives a relatively large amount of water and the receives progressively lesser amounts of water, the rate of application of water to each ground area increment always being equal to or less than the maximum intake rate of the soil so that no flooding of the ground surface occurs. The apparatus disclosed provides for a water dispensing means with means for moving it over the ground. The dispensing means includes a plurality of water discharging means providing different discharge rates into predetermined areas, the rate of water discharge being greatest in the area along the leading edge of the direction of travel and being progressively less in adjacent areas extending toward the trailing edge of the overall discharge area.

---

This invention relates to an irrigation method for applying water by sprinkling to land areas and also to apparatus for carrying out the method.

The purpose of irrigation is to apply water to the land surface so that it can enter the soil and be stored in it for subsequent use by plants, and a common mode of irrigating is to apply water by a sprinkling means. For most crops this method is particularly beneficial, and for many it is the only practical method for applying water to a land area. In sprinkling systems heretofore devised water was applied to the ground surface at a constant rate throughout the sprinkled area in either of two general methods. The first, and until recent years the only method was to sprinkle from a stationary pipe, at a relatively low application rate, until the desired amount of water was absorbed by the soil. The pipe was then moved and the sprinkling repeated on an additional part of the area to be irrigated. A relatively long period of time (several hours to as much as two days) was required and the application rate had to be at minimum rate to prevent flooding, run-off and soil structure damage.

The second general method was to sprinkle at a constant rate from a continuously moving pipe. Irrigation by this latter method employed higher constant application rates and an area of ground was irrigated for a shorter period of time than with the first method. However, here again the length of time a given area of ground could be watered without flooding was dependent on the constant application rate employed.

The present invention applies in general to this second method wherein water is distributed over the ground while the sprinkling source is in constant motion, and it also utilizes some of the principles of soil characteristics which are discussed briefly below.

It is known that if a continual supply of water is kept in contact with the surface of an unsaturated soil the amount of water the soil is able to absorb is in general accord with the Equation (A) $D=at^n$, where "$D$" is the depth of water absorbed; "$a$," "$n$" are constants dependent on the soil and its initial condition at the time sprinkling is started; and "$t$" is unit time.

It follows from Equation (A) that the rate water is absorbed at any given instant is the differential of Equation (A), or (B) $I=nat^{n-1}$, where "$I$" equals the instantaneous intake rate. The above Equation (B) shows that initially the soil has the capability of absorbing water at a very high rate and that this capability diminishes exponentially with time of application.

When water is applied at a constant rate, "$I_c$," it can be absorbed by the soil only for the length of time given by Equation (B) when $I_c=I$. Since from Equation B $I=nat^{n-1}$ the total amount of water than can be absorbed from constant rate sprinkling is (C) $D_c=nat_c^n$ where "$t_c$" is the time of sprinkling at a constant rate.

The relative time required to apply a given amount of water at constant rate sprinkling as compared to maximum rate sprinkling is found by equating Equations (A) and (C) when $D=D_c$. This gives (D)
$$\frac{t}{t_c}=(n)^{\frac{1}{n}}$$

It can be seen from the above equation that if $n=0.40$ (a common value met with in the field), it will take ten times the time to perform the irrigation at a constant rate compared to that which could be done at the maximum variable rate.

It is therefore a general object of the present invention to provide an improved method for sprinkling an area of ground which applies water from a moving sprinkler to the ground area at or near the natural predetermined capability of the soil to absorb or take in the water without allowing flooding to occur on the ground surface thereby facilitating an increased application of water to the ground area in a minimum time period. The time-saving factor that is made possible by my invention in terms of the substantially increased utilization of labor and equipment represents an important step forward in the irrigation art.

Another object of the present invention is to provide a method for sprinkling an area of ground that applies water to it at a variable rate which is equal to or less than the maximum intake capacity of the particular area being irrigated, as defined by the aforesaid curve $I=naT^{n-1}$, so that the irrigation can be accomplished within a minimum of time with no surface flooding.

Another object of the present invention is to provide a method for applying water to a field wherein water distribution means is moved over the ground while discharging water in a moving application pattern having a leading edge portion in its direction of movement which provides a greater volume of water than successive adjacent pattern portions which diminish in application rate per unit area toward the trailing edge of the pattern. In this manner, the water is applied to increments of field area at a rate that is initially relatively high and then at successive decreasing rates which are always somewhat less than the intake rate capability of the soil.

Still another object of the present invention is to provide an apparatus for carrying out the aforesaid method which moves over the ground while applying water to an increment of area by means of a discharge pattern comprised of a series of successive adjacent portions having different discharge rates starting at a relatively high rate from a leading edge and decreasing to a reducted discharge rate at a trailing edge so that at any time water is always applied to the ground at a rate that is equal to or less than the intake rate capability of the soil.

Another object of the present invention is to provide a sprinkling apparatus for carrying out the aforesaid method that can be operated automatically without the need for manual manipulation.

Another object of the present invention is to provide a sprinkling apparatus for carrying out the aforesaid method which includes a water distribution means that moves over the ground by pivoting about a vertical axis at one of its ends, there being a series of discharge means along the water distribution means forming a continuous pattern on the ground which supplies a greater amount of water at its leading edge in the direction of travel and progressively lesser amounts towards the trailing edge of the pattern.

Other objects, advantages and features of the invention will become apparent from the following detailed description presented in conjunction with the accompanying drawing, in which:

FIG. 1 is a graph showing typical curves representing the total water accumulation (D) and the maximum water intake rate (I) plotted against time for a typical soil;

FIG. 2 is a schematic view in perspective of an apparatus illustrating the method according to my invention;

FIG. 2a is a chart showing the relationship between water application rate for the apparatus of FIG. 2;

FIG. 3 is an enlarged and more detailed view in elevation of a sprinkling apparatus embodying the principles of my invention;

FIG. is a plan view of the apparatus shown in FIG. 3;

FIG. 5 is a plan view of a pivotal type of irrigating apparatus embodying the principles of the present invention;

FIG. 6 is a view in cross section taken along line 6—6 of FIG. 5.

The method according to my invention may best be described by first referring to FIG. 1 which illustrates a typical pair of curves plotted on the same coordinates and showing the relationship of water intake rate with respect to time for a typical soil. The curve designated by the numeral 10 is derived from the formula $D=aT^n$, where "D" equals the accumulated amount of water taken in by soil when it is taken in at its maximum intake rate; "$a$" is a constant related to a particular soil, which is easily determinable by soil tests; and "$n$" is another constant which for most soils is approximately 0.5. This curve may readily be ascertained from simple tests of soil samples from the area to be irrigated. The other curve designated by the numeral 12 is the derivative of the curve 10 and is thus represented by the formula $I=naT^{n-1}$, where "I" is the instantaneous intake rate (e.g., in/hr.) for the soil at any time "T." Examination of this latter curve indicates that when water is first applied to a piece of land being irrigated the intake rate is high. That is, the soil has a capability of absorbing water at a relatively high intake rate. As the accumulated moisture content (D) of the soil increases as indicated by curve 10, the water intake rate capability (I) is reduced according to the exponential curve 12. If, at any time the water is applied at a rate greater than the present maximum intake rate capability, flooding of the ground will occur. Consequently, in conventional irrigation systems, water is applied to an area of land at a constant rate over a period of time. This constant rate as indicated by the dotted line 13, must be relatively low so that it will always be below the maximum intake rate capability for the soil in order to avoid flooding. On the other hand, if water is applied to an increment of ground area at a variable rate that is always equal to or just below the maximum intake rate capability indicated by the curve 12, a far greater amount of water can be applied to the ground in a particular time period than if water was applied in the conventional manner at the constant rate low enough to avoid flooding. This is particularly true when the water is first applied, as indicated by the steep slope of the "I" curve in FIG. 1.

My irrigation method, according to the present invention, utilizes the foregoing principle of the water intake rate capability of soil. Broadly stated, the method entails sprinkling in a differential pattern so that each increment of ground area receives water initially at a relatively high rate and then at a steadily decreasing rate which is always below the critical intake rate capacity of the soil.

Referring to FIG. 2, a somewhat schematic view of a sprinkler apparatus 14 is shown for the purpose of illustrating and explaining the steps of my method. In effect, this apparatus comprises a suitable elongated water distribution means, such as a large pipe 16, which is supported above the ground and whose longitudinal axis extends transversely across the ground area 18 being irrigated. The pipe is moved steadily over the ground in a direction generally indicated by the directional arrow. The surface of the pipe is provided with a series of circumferentially spaced apart rows of discharge openings, the rows being parallel to the pipe axis. In this diagrammatic representation of an apparatus in FIG. 2, only six such rows are shown, and in each the discharge openings 20 are of a different size and/or number that provides a predetermined discharge rate. The rows of openings are so located as to direct the water from them in streams that fall to the ground beneath the pipe in six adjacent increments of the illustrative precipitation pattern. Nearest the bottom of the pipe, the openings 20a are largest in size; the row next to it has openings 20b of a smaller size or number; and the size or number of the openings in successive rows also decreases in a predetermined manner. The last row which projects the water the farthest, has the smallest openings 20f. The leading edge increment 22a of the precipitation pattern in the direction of movement of the pipe therefore receives the maximum amount of water, and the trailing edge increment 22f of the pattern receives the least amount of water. Now, when the pipe 16 moves over the ground, all of the precipitation pattern increments of water from its rows of discharge openings pass in succession over the increment of a ground area "A" which may be representative of the entire area being irrigated. As the pipe, and thus its precipitation pattern, moves, the area A first receives the leading edge pattern increment 22a, as shown in FIG. 2, in a time period "$T_1$," this relatively large amount of water being supplied from the first row of discharge openings 20a. Assume at this point, water from these larger openings 20a is supplied to the area A at just under the initial intake rate capacity for the soil. The relative amount of this first increment 22a and of succeeding increments 22b, 22c, 22d, 22e and 22f, supplied to the ground area A is represented in the chart designated FIG. 2a, which illustrates how the ground area A receives water as the apparatus 14 passes over it. After the first increment 22a of the pattern has entered the soil, the water intake rate capability of the soil is decreased. However, as the pipe and its precipitation pattern moves along the ground, the next row of openings 20b applies its second increment in a time "$T_2$" which is a lesser amount of water that still does not exceed the reduced intake capability of the soil area A. This second increment is also shown in FIG. 2a. As the pipe continues to move over the area A, the other increments of the precipitation pattern are supplied to it in succession over connected time periods of "$T_3$" to "$T_6$." In each time period a decreasing amount of water is supplied to the ground area A which is always no greater than its intake rate capability. After the water distribution means (e.g., the pipe 16) and its precipitation pattern has passed over the area increment A and thus over the entire ground area, the ground has received a total accumulated amount of water represented by all the shaded areas of FIG. 2a. Yet, since each increment of water was supplied with respect to time at or less than the intake rate capability of the soil, no surface flooding would occur on the ground. It is apparent in FIG. 2a that the curve shown which represents an approximate line drawn through the maximum points for each precipitation increment is similar to the typical "I" curve as shown in FIG. 1.

It should be understood that the foregoing explanation with reference to "increments" of the precipitation pattern is merely for illustrative purposes; and the method, according to my invention, is not limited to applying a precipitation pattern comprised of separate increments. In other words, the pattern may be produced by a suitable nozzle or nozzles capable of providing a spray pattern having a smooth transistion from a high rate leading edge to a low rate trailing edge and substantially in conformance to the typical "I" curve for the soil being irrigated. The actual amount of water applied from a series of openings or such a nozzle in a pipe at a known water pressure and to a ground area at a given distance from the pipe can be determined. Assuming a constant speed for the pipe over the ground, the number and size of openings per unit length of the pipe or the type of nozzle required can also be provided so that every ground area increment will receive the desired amount of water from the moving pipe in accordance with the existing intake rate capability of the soil. The forward speed of the apparatus as required by my method can be set to increase or decrease the application rate of water of the water distribution means thereby affording a flexibility for accommodating various types of soil.

An apparatus $14a$ for practising my method is illustrated in FIGS. 3 and 4. In general, it comprises an elongated distribution pipe $16a$ which is supported by a series of spaced apart frame members 30 connected to a truck that is movable over the ground. The latter could be a pair of spaced apart wheels 32, as shown, or it could be an endless track type crawler. A suitable power transmission means 36 is connected to the drive wheels of each truck unit, and this may comprise an engine 38 connected to a conventional variable speed drive. The trucks and thus the distribution pipe can thus be moved a constant preselected velocity over the ground while being oriented on a line extending across the field. The distribution pipe $16a$ is supplied with water from a pump station by a flexible conduit 40 which is connected to the pipe at some convenient location.

The distribution pipe may have simple openings which are sized to discharge water at different rates, as previously described with reference to FIG. 2. However, for larger installations the discharge means on the pipe $16a$ is comprised of a plurality of nozzles 42 which are spaced apart along its length, with each nozzle providing a predetermined flow rate and direction and producing the desired precipitation pattern 43 on the ground. In accordance with the principles of my invention, this distribution pattern provides a heavier concentration of water at its leading edge in the direction of travel, and this concentration decreases toward the trailing edge of the pattern as previously described. The nozzles are installed so that they direct the discharge of the water rearwardly of the moving apparatus so that the leading edge of the precipitation pattern strikes the ground rearwardly of the wheels which thus do not have to traverse wet ground.

As shown in another embodiment of my invention in FIG. 5, an apparatus $14b$ of the pivotal type may be used. Here, a water distribution pipe $16b$ is pivotally supported at one end and supplied with water under pressure. The pipe $16b$ is supported above the ground by suitable means that are movable over the ground, such as a series of frame members $30b$ having a pair of wheels $32b$, as previously described. Again, a suitable motor and drive system (not shown) may be provided for pushing the pipe over the ground around its pivotally mounted end. Along its length the pipe $16b$ is provided with a plurality of nozzles 44 which are spaced apart and designed to provide the desired precipitation pattern according to the present invention. Since the distribution pipe rotates about a vertical axis at one end the pipe nearest the axis obviously travels over the ground at a slower rate than the pipe at its outer end. This means that extending outwardly from the inner end of the pipe near its axis of rotation to its outer end, the nozzles must provide an increasingly greater amount of precipitation. One way of accomplishing this, as shown in FIG. 5, is to make the entire precipitation ground pattern 46 essentially pie-shaped. The variation in ground pattern from nozzle to nozzle can be accomplished both by internal changes in the nozzle and also by controlling the pressure to each nozzle. The latter may be accomplished, as shown in FIG. 6, by a regulating valve 48 located in a connector 50 which joins the nozzle to the pipe $16b$. Each nozzle, of course, is also designed to produce the differential precipitation pattern which provides a heavy concentration of water at its leading edge and a progressively lesser amount of water toward its trailing edge.

The actual operation of either apparatus in carrying out my method should be readily apparent from the foregoing. Generally, a test of the soil to be irrigated is made before the discharge means are adjusted to determine the soil characteristics so that they can form a precipitation pattern that will closely approximate the curve $I = naT^{n-1}$ as the apparatus moves steadily over the ground. In actual operation, the speed of the apparatus can be regulated to provide the desired application rate, and it may not be practical or desirable in all instances to apply water at the maximum intake rate. However, if such is the objective and the present condition of the soil prior to irrigation is not known precisely, the operator of the apparatus can start his initial run at a relatively slow speed. If surface flooding commences to occur, the apparatus can merely be speeded up until the speed is such that no flooding takes place, even though the moving differential pattern is constantly applying water at close to the intake rate capacity of the soil.

While the fundamental theory and mechanics of my method may be readily proven by laboratory tests an actual field irrigation test was made and will be described below as one example of an actual application of the method. The results of these tests, although more qualitative than quantitative, definitely proved the functionality of my method and in addition produced some new and unexpected advantageous results.

Example:

An experimental machine was constructed consisting of 210 ft. of 5-inch pipe supported by 5 sets of wheels. The machine was driven by a gasoline engine through a variable speed drive which provide operation at speeds of from 40 to 300 ft. per hour.

This machine was installed on a truck farm near Milpitas, California, and in a field freshly planted with rows of broccoli plants. The soil was analyzed and found to vary from a fine textured loam to a coarse textured, silty clay loam, the clay content varying from 19 to 20%. In the opinion of an expert observer, this was considered to be fairly difficult soil to sprinkle and conventional moving sprinkling devices could not operate satisfactorily in it. Tests showed the conventional application rate to be limited to about 0.3 inch per hour ("$a$"$\cong 0.12$).

One-half of the test pipe was arranged to apply water at a uniform rate and the other side to apply water at a semi-differential rate, substantially according to my method. Over 20 test runs were made during the period from Sept. 9, 1967, to Nov. 3, 1967.

The results may be summerized by some observations of persons skilled and knowledgeable in the field of irrigation:

(1) A significant difference in the surface conditions of the soil occurred between the area receiving water in the conventional manner and the area receiving water by the differential method, according to the present invention.

(2) Differential application showed less tendency to break down the soil structure (tilth).

(3) Applications of 1.5" were readily absorbed by the soil on the differential side but more or less flooded the uniform side. In this case the differential application appeared to be close to the critical rate. In this case the "$a$" value was 0.23.

(4) The "K-4" differential pattern (10 ft. spread) showed, run No. 18, Station 1, that the soil absorbed 0.31″ in 2.33 minutes without saturating the surface. This corresponds to an "$a$" value of 0.20 and an average application rate of 8.0″ *per hour* which is more than 20 times the conventional rate. When 0.53″ were applied in 4.0 minutes, much of the surface was saturated causing damage to the soil structure. "$a$" in this case was 0.265.

(5) Six applications were made in a period of 7 days at 0.3″ per application. At the end of this time the soil down to a depth of one foot was approaching saturation and consequently irrigation was stopped for a period of time. On the differential side using the method according to the present invention, the soil structure remained reasonably good and there was little, if any, standing water. On the side using conventional sprinkling, the soil structure was badly broken down and there was considerable standing water.

(6) There was a significant difference in the ability of the soil to absorb water between the uniform and the differential rates. When there was a difference (which was most of the time (the differential side always had less, if any, standing water, and damage to the structure was less than that of the uniform side.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A method of irrigating a predetermined ground area that facilitates the application of water to the ground at the maximum rate without causing surface flooding, said method comprising the steps of:
producing a distribution pattern of water on the ground having a leading edge providing a greater concentration of water per unit area and a progressively lesser concentration of water per unit area in the pattern from the leading edge to a trailing edge;
and moving said pattern over the ground in the direction of the leading edge.

2. A method of overhead irrigation, comprising:
distributing water in a pattern on the ground with a high flow rate at a leading edge and progressively decreasing flow rates behind said leading edge to a flow rate that is lowest at a trailing edge; and
moving the pattern forwardly so that the pattern passes over the ground with the leading edge first and the trailing edge last,
thereby enabling the soil to absorb a desired application of water in a minimum time.

3. The method as described in claim 2 wherein said pattern provides a concentration of precipitation from its leading edge to its trailing edge that substantially approximates the intake rate curve $I=naT^{n-1}$ for soils where "$I$" is the intake rate, "$n$" and "$a$" are constants which vary according to the characteristics of the soil being irrigated, and "$T$" is time.

4. The method as described in claim 2 wherein said pattern is directed rearwardly of its direction of travel by means of water pressure.

5. The method as described in claim 2 wherein a series of said patterns of different size are directed from a water distribution pipe that is pivoted about one end, and decreasing the amount of precipitation in said patterns from the outer end of said pipe to its pivotal end.

6. An apparatus for surface irrigating a predetermined ground area, comprising:
means for supplying water under pressure from a supply source;
a water distribution means having a forward end and a rear end and connected to said means;
means for moving said water distribution means over said ground area while water is being discharged;
said water distribution means including means for discharging water therefrom so that the water continuously produces a predetermined pattern as it strikes the ground, said pattern having a leading edge in the direction of travel over the ground providing a relatively high application rate of water per unit area and a progressively decreasing application rate of water extending from the leading edge toward the trailing edge of the pattern.

7. An apparatus for surface irrigating a predetermined ground area, comprising:
conduit means for supplying water under pressure from a supply source;
a water distribution means connected to said conduit means;
drive means for moving said water distribution means over said ground area while water is being discharged;
said water distribution means including discharge means providing a plurality of outlet streams forming a precipitation pattern on the ground which at any time receives water along its leading edge in the direction of travel at a relatively high rate per unit area and at a progressively lesser rate per unit area with the pattern towards its trailing edge;
whereby as the apparatus passes over the ground, water is applied to it first at a rapid rate commensurate with its intake rate capacity and thereafter at lesser rates as the intake rate capacity decreases.

8. The apparatus as described in claim 7 wherein said discharge means produces a precipitation pattern on the ground which, when the apparatus moves at a preselected speed, supplies water to the ground at substantially maximum intake rate capacity of the soil as defined by the equation $I=naT^{n-1}$ where "$n$" *and* "$a$" are constants related to characteristics of the soil being irrigated, and "$T$" is time.

9. The apparatus as described in claim 7 wherein said water distribution means comprises a pipe support above and extending longitudinally across the ground area to be irrigated, said discharge means being spaced apart along said pipe, said drive means including means for moving said pipe in a direction substantially perpendicular to its longitudinal axis.

10. The apparatus as described in claim 7 wherein said discharge means comprises a series of circumferentially spaced apart rows of openings in said pipe, the number and size of openings in each row providing a different discharge rate of water with the row providing water for said leading edge zone providing the greatest flow rate and the other rows providing lesser amounts of water in successive zones toward the trailing edge of the ground pattern.

11. The apparatus as described in claim 7 wherein said water distribution means comprises a pipe pivotally mounted at one end and supported above the ground along its length, said drive means causing said pipe to sweep out a circular area as it moves over the ground, said discharge means comprising a plurality of nozzles spaced apart on said pipe, each providing a said differential precipitation pattern.

12. The apparatus as described in claim 11 including valve means for each said nozzle connected to said pipe for controlling the size of said precipitation pattern produced by each nozzle, whereby said patterns are made to decrease in area and flow from the outer end of the pipe towards its pivotal end.

13. In a sprinkling type irrigation system including a conduit for supplying water under pressure from a supply source, a water distribution pipe connected to said conduit, means for supporting the pipe above the ground and means for moving it over the ground at a preselected rate, the improvement in combination therewith comprising: water discharge means on said pipe for forming a precipitation pattern on the ground having a leading edge with a higher rate of precipitation than any other part of said pattern and a trailing edge with a lower rate of precipitation than any other part of said pattern, the rate of precipitation at any point between said leading and trailing edges varying in relation to the distance of said point from said leading and trailing edges.

14. The system as described in claim 13 wherein the precipitation rate of said pattern provided by said water discharge means varies between said leading and trailing edges shubstantially along an exponential curve.

15. The system as described in claim 13 wherein the precipitation pattern provided by said water discharge is comprised of a series of increments which decrease from a leading edge increment of a relative high rate of precipitation to a trailing edge increment of a relative low rate of precipitation.

References Cited

UNITED STATES PATENTS 2,859,064   11/1958   Nelson.
3,259,319   7/1966   Wallace _____ 239—177

M. HENSON WOOD, Jr. Primary Examiner

M. Y. MAR, Assistant Examiner

U.S. Cl. X.R.

137—344; 239—177, 212